(12) United States Patent
Bui et al.

(10) Patent No.: US 8,179,829 B2
(45) Date of Patent: May 15, 2012

(54) DELIVERY OF MULTICAST AND UNI-CAST SERVICES IN AN OFDMA SYSTEM

(75) Inventors: Thanh Bui, Mulgrave (AU); Dobrica Vasic, Mulgrave (AU)

(73) Assignee: NEC Corporation, Tokyo (JP)

( * ) Notice: Subject to any disclaimer, the term of this patent is extended or adjusted under 35 U.S.C. 154(b) by 849 days.

(21) Appl. No.: 12/162,428

(22) PCT Filed: Feb. 8, 2007

(86) PCT No.: PCT/JP2007/052656
§ 371 (c)(1),
(2), (4) Date: Jul. 28, 2008

(87) PCT Pub. No.: WO2007/091724
PCT Pub. Date: Aug. 16, 2007

(65) Prior Publication Data
US 2009/0010196 A1    Jan. 8, 2009

(30) Foreign Application Priority Data

Feb. 8, 2006  (AU) ................................ 2006900610
Jan. 17, 2007 (AU) ................................ 2007200185

(51) Int. Cl.
*H04H 20/71* (2008.01)
*H04W 4/00* (2009.01)
*H04K 1/10* (2006.01)
(52) U.S. Cl. .................. 370/312; 370/314; 375/260
(58) Field of Classification Search ............... 370/312, 370/314; 375/260
See application file for complete search history.

(56) References Cited

U.S. PATENT DOCUMENTS

| 6,665,352 | B2 * | 12/2003 | Lerner et al. ............. 375/296 |
| 7,631,080 | B2 * | 12/2009 | Epstein et al. ............. 709/226 |
| 2004/0042479 | A1 * | 3/2004 | Epstein et al. ............. 370/432 |
| 2004/0085960 | A1 * | 5/2004 | Henrion ................ 370/390 |
| 2006/0035661 | A1 | 2/2006 | Niwano et al. |
| 2006/0067206 | A1 * | 3/2006 | Mantravadi et al. ....... 370/208 |
| 2006/0098567 | A1 * | 5/2006 | Willenegger et al. ....... 370/206 |
| 2008/0084818 | A1 * | 4/2008 | Yoon et al. ............. 370/210 |
| 2008/0318527 | A1 * | 12/2008 | Higuchi et al. ........... 455/42 |
| 2009/0004971 | A1 * | 1/2009 | Dateki et al. ............ 455/62 |
| 2009/0016254 | A1 * | 1/2009 | Lee et al. .............. 370/312 |
| 2009/0196165 | A1 * | 8/2009 | Morimoto et al. .......... 370/208 |
| 2009/0316614 | A1 * | 12/2009 | Kim et al. .............. 370/312 |

(Continued)

FOREIGN PATENT DOCUMENTS

EP    1 760 907 A1    3/2007

(Continued)

*Primary Examiner* — Chi Pham
*Assistant Examiner* — Farah Faroul
(74) *Attorney, Agent, or Firm* — Scully, Scott, Murphy & Presser, P.C.

(57) ABSTRACT

A method of operating a radio telecommunications network including, a plurality of base transceiver stations (BTSs) each transmitting on a respective transmission bandwidth, and one or more mobile terminals (MTs) each having a respective maximum reception bandwidth, defining a common multicast frequency band within the transmission bandwidth of at least a first group of BTSs of the network on which the multicast service is to be transmitted; transmitting a multicast service in the common multicast frequency band from each BTS within the first group of BTSs; and enabling each base station having a bandwidth greater than the width of the common multicast frequency band to transmit a uni-cast service in portion of its transmission bandwidth falling outside the multicast frequency band.

18 Claims, 3 Drawing Sheets

U.S. PATENT DOCUMENTS

| | | | |
|---|---|---|---|
| 2010/0172278 A1* | 7/2010 | Nishio et al. | 370/312 |
| 2010/0232333 A1* | 9/2010 | Higuchi et al. | 370/312 |
| 2010/0310025 A1* | 12/2010 | Morimoto et al. | 375/346 |
| 2011/0070905 A1* | 3/2011 | Kazmi et al. | 455/507 |
| 2011/0103290 A1* | 5/2011 | Suzuki et al. | 370/312 |

FOREIGN PATENT DOCUMENTS

| | | |
|---|---|---|
| JP | 2005-130010 | 5/2005 |
| JP | 2006-025337 | 1/2006 |
| WO | WO 2005/079097 A1 | 8/2005 |
| WO | WO 2006/011347 A1 | 2/2006 |

\* cited by examiner

DELIVERY OF MULTICAST AND UNI-CAST SERVICES IN AN OFDMA SYSTEM

TECHNICAL FIELD

The present invention relates to methods and systems for supporting multicast and uni-cast services in a radio telecommunications networks. In a preferred embodiment the present invention provides methods and systems for providing a multimedia broadcast multicast service (MBMS) and a uni-cast service on a radio telecommunications network employing orthogonal frequency division multiple access (OFDMA).

BACKGROUND ART

To meet an anticipated increase in user demand for high data rate and unproved service quality in the future the 3GGP has identified that it will be desirable to develop new networks for deployment in the medium to long term providing data rates of up to 100 MBPS in the downlink direction and 50 MBPS in the uplink direction. In order to achieve this increased data rate with acceptable quality such networks will implement OFDMA and have a maximum downlink transmission bandwidth of 20 MHz.

Notwithstanding the desired 20 MHz peak bandwidth criterion set out above, it is likely that for one reason or another cells with lower bandwidth such as 5 MHz, 10 MHz, 15 MHz, or even 1.25 MHz or 2.5 MHz will also exist. It is also desirable that UEs (User Equipments) having different reception capabilities, i.e. reception bandwidths will be able to communicate with such networks. As will be appreciated, higher capability handsets are likely to be more complex and therefore more expensive, and thus some users will be willing to trade off performance to obtain a cheaper handset.

DISCLOSURE OF INVENTION

One of the services identified by the 3GPP for inclusion in this next generation of networks is multimedia broadcast multicast service (MBMS). Although MBMS is currently supported in 3G networks, its implementation in the next generation of networks will be significantly different due to the fact that OFDMA will be employed in such networks, rather than WCDMA, as is currently used. Accordingly there is a need to provide systems and methods that enable the deployment of MBMS in these networks in the future.

Moreover the because of the extended bandwidth of these future systems it is desirable that any deployment scheme for MBMS also allows the transmission of uni-cast services at the same time as an MBMS service. Accordingly there is a need for systems and methods that enable physical resource sharing between MBMS and uni-cast services.

In a first aspect the present invention provides a method of operating a radio telecommunications network including, a plurality of base transceiver stations (BTS) each transmitting on a respective transmission bandwidth, and one or more mobile terminal (MT) each having a respective maximum reception bandwidth, defining a common multicast frequency band within the transmission bandwidth of at least a first group of BTS of the network on which the multicast service is to be transmitted; transmitting a multicast service in the common multicast frequency band from each BTS within the first group of BTS; and enabling each base station having a bandwidth greater than the width of the common multicast frequency band to transmit a uni-cast service in portion of its transmission bandwidth falling outside the multicast frequency band.

In certain embodiments of the method the frequency of the common multicast frequency band is predefined.

Preferably, the common multicast frequency band has a bandwidth equal to the lowest maximum reception bandwidth amongst the MT.

In some embodiments the first group of BTSs includes all BTSs in the network.

In a second aspect the present invention provides a method of transmitting a multicast service on a base transceiver station (BTS) having a first transmission bandwidth, to one or more mobile terminal (MT) each having a respective maximum reception bandwidth, the method including: transmitting a multicast service in a predefined multicast frequency band; and transmitting a uni-cast service in one or more frequency bands falling outside the multicast frequency band, in the event that first transmission bandwidth is larger than the bandwidth of the multicast frequency band.

The method can further include, adding a long cyclic prefix to a time domain signal including said multicast data.

The method can further include, combining signals representing said uni-cast service and said multicast service to generate a transmitted signal such that the orthogonality of a plurality of sub-carriers forming the signals representing said uni-cast service and said multicast service is maintained in the transmitted signal.

The method can further include: multiplexing data representing said uni-cast service and data representing said multicast service in the frequency domain; and converting the multiplexed frequency domain signal into a time domain signal.

The step of, converting the multiplexed frequency domain signal, can include, performing an inverse fast Fourier transform (IFFT) having a size dependent on the first transmission bandwidth.

The method can further include: converting the data representing said uni-cast service to a time domain signal; and converting the data representing said multicast service to a time domain signal separately to said data representing said uni-cast service.

In a third aspect the present invention provides a method of transmitting a multicast service on a base transceiver station as claimed in claim 10 wherein the step of, converting the data representing said uni-cast service to a time domain signal, includes: performing an inverse fast Fourier transform (IFFT) having a size dependent on the first transmission bandwidth.

The step of, converting the data representing said multicast service to a time domain signal, can include: performing an inverse fast Fourier transform (IFFT) having a size dependent on the first transmission bandwidth.

The method can further include: adding a first cyclic prefix having a first length to the time domain signal carrying the uni-cast service; and adding a second cyclic prefix having a second length to the time domain signal carrying the multicast service, wherein the second length is longer than said first length; and adding said time domain signals prior to transmission to said MT.

The method can further include: adding a long cyclic prefix to the time domain signal generated from said multiplexed signal.

The method can further include: adding a short cyclic prefix to the time domain signal generated from said multiplexed signal, in the event that no multicast service is to be transmitted in a particular time transmission interval.

The method can further include signalling to one or more MT whether a multicast service is to be transmitted in a particular time transmission interval.

In a fourth aspect the present invention provides a method, in a mobile terminal (MT) of a radio telecommunications network including one or more base transceiver stations (BTS) each transmitting on a respective transmission bandwidth, a portion of which is designated for transmission of one or more multicast services, said MT having a first maximum reception bandwidth; the method including: tuning a receiver to a reception frequency band encompassing the portion of the transmission bandwidth designated for transmission of one or more multicast services; determining a length of a cyclic prefix used to transmit at least the portion of the signal containing the data associated with a multicast service; removing a cyclic prefix of said determined length from at least the portion of the signal containing the data associated with a multicast service; and converting the portion of the signal containing the data associated with a multicast service into a frequency domain signal using a fast Fourier transform having a size determined by the size of the portion of the transmission bandwidth used to transmit a multicast service.

The method can further include: removing a cyclic prefix, having a length shorter than said determined length, from a second portion of the signal containing data associated with a uni-cast service; and converting second portion of the signal containing the data associated with a uni-cast service into a frequency domain signal using a fast Fourier transform having a size determined by the size of the portion of the transmission bandwidth used to transmit the uni-cast service.

In a fifth aspect the present invention provides a method, in a mobile terminal (MT) of a radio telecommunications network including one or more base transceiver stations (BTS) each transmitting on a respective transmission bandwidth, a portion of which is designated for transmission of one or more multicast services, said MT having a first maximum reception bandwidth; the method including; tuning a receiver to a reception frequency band encompassing the portion of the transmission bandwidth designated for transmission of one or more multicast services; determining a length of a cyclic prefix used for transmission of the signal in a particular transmission time interval, removing a cyclic prefix of said determined length from the corresponding received signal; and converting the received signal into a frequency domain signal using a fast Fourier transform having a size determined by the reception bandwidth of the MT.

In a sixth aspect the present invention provides a method of receiving a uni-cast service, in a mobile terminal (MT) in communication with at least one base transceiver stations (BTS) transmitting on a respective transmission bandwidth, a portion of said bandwidth being designated for transmission of one or more multicast services; the method including: tuning a receiver to a reception frequency band;

Determining a length of a cyclic prefix used for transmission of the signal in a particular transmission time interval, removing a cyclic prefix of said determined length from the corresponding received signal; and converting the received signal into a frequency domain signal using a fast Fourier transform having a size determined by the reception bandwidth of the MT.

The length of a cyclic prefix can be determined on the basis of received signalling data.

The method can include: reading a multicast control channel; and determining, on the basis of data received on the multicast control channel whether one or more transmission time intervals contains a multicast service; and determining the length of a cyclic prefix used for transmission of the signal in the particular transmission time interval on the basis of the presence or absence of one or more multicast services in that particular transmission time interval.

The cyclic prefix can be determined by blind detection of the length of said cyclic prefix.

In a seventh aspect the present invention provides a method of scheduling the transmission of at least one multicast service and a uni-cast service on a base transceiver station (BTS) having a first transmission bandwidth, to a mobile terminal (MT) operating at a reception bandwidth less than the first transmission bandwidth, wherein said multicast service is transmitted in a predefined common multicast frequency band; and said uni-cast service is transmitted in one or more frequency bands falling outside the multicast frequency band, wherein, in the event that the MT is configured to receive its uni-cast service on a reception frequency band that does not encompass the multicast frequency band, the method includes: scheduling transmission of said multicast service in at least one first transmission time interval, and scheduling transmission said uni-cast services in at least one different, second transmission time interval, wherein said first and second transmission time intervals are not consecutive.

The method can include allowing at least a predetermined time interval between scheduled time intervals for transmission of said uni-cast service and said multicast service.

The method can include scheduling a time interval between said uni-cast service and said multicast service sufficient to allow said mobile terminal to switch between a reception band encompassing the said multicast service and reception band containing said uni-cast service, or vice versa.

The scheduling of multicast and uni-cast services can be conducted in accordance with signalling data, received from the MT, indicating the one or more multicast services to be received by said MT.

In an eighth aspect the present invention provides a method of receiving a multicast service and a uni-cast service in a mobile terminal (MT) operating at a first reception bandwidth, said services being received from a base transceiver station (BTS) having a transmission bandwidth larger than the first reception bandwidth, wherein said multicast service is transmitted in a predefined common multicast frequency band within the transmission bandwidth; and receiving the uni-cast service in a reception frequency band that does not encompass the multicast frequency band; changing the reception frequency band of the MT to a frequency band that encompasses the multicast frequency band; receiving the uni-cast service and multicast service on said changed reception frequency band.

The step of, changing the reception frequency band of the MT, can be performed autonomously by the MT and the method further includes: signalling the BTS to either, request a change of the reception frequency band; or inform the BTS that the MT has changed reception frequency bands.

The method can include: receiving signalling data at the MT instructing the MT to change reception frequency bands.

In a further aspect the present invention provides a MT configured to implement a method embodying any one of the above mentioned aspects of the present invention.

In a further aspect the present invention provides a transmitter configured to implement a method embodying any one of the above mentioned aspects of the present invention.

In a further aspect the present invention provides a radio telecommunications network configured to implement a method embodying any one of the above mentioned aspects of the present invention.

BRIEF DESCRIPTION OF DRAWINGS

Preferred embodiments of the present invention will now be described by way of non-limiting example only with reference to the accompanying drawings, in which.

BEST MODE FOR CARRYING OUT THE INVENTION

It will be convenient to describe the preferred embodiments using terminology adopted by the 3GPP, however the present invention should not be considered as being limited to application in networks operating according to a 3GPP standard.

Preferred embodiments of the present invention will now be described in the context of a OFDMA telecommunications network having UEs with 5 MHz, 10 MHz, 15 MHz and 20 MHz reception bandwidth. It is assumed that the maximum reception bandwidth supported by the lowest capability UE in the network is 5 MHz. This is a reasonable assumption as current WCDMA UEs have a 5 MHz reception bandwidth, and it is expected that in the future UEs will at least support this standard. It is also assumed that UEs have a capability of receiving only one 5 MHz wide MBMS data stream. This assumption is based on current Rel'6 3GPP specifications for MBMS in WCDMA networks. In the preferred embodiments the parameters for downlink transmission processing and transmission are as indicated in Table 1.

long. Therefore, when the network is transmitting MBMS data a long cyclic prefix (CP) will be used to cope with long delay and to relax inter cell synchronization requirements.

Two exemplary implementations of the present invention will now be described in relation to FIGS. 1 and 2 of the accompanying drawings.

Figure 1:
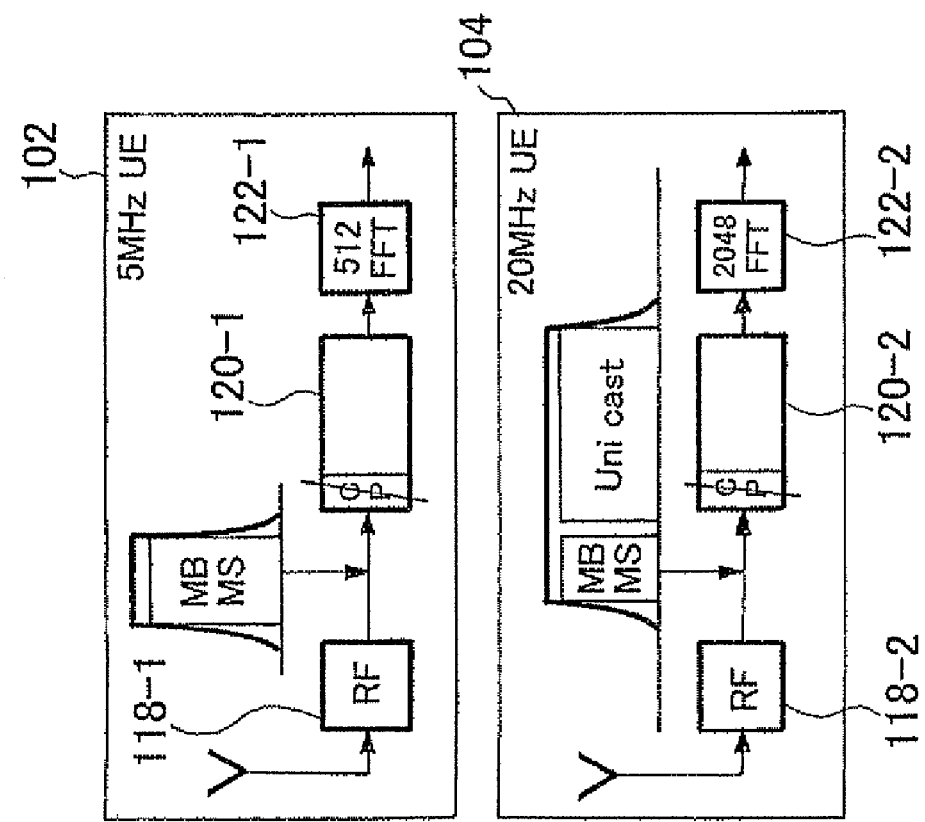
FIG. 1 depicts a schematic diagram of a base station transmitter and two UEs operating in a network operating according to a first embodiment of the present invention.
Figure 1:
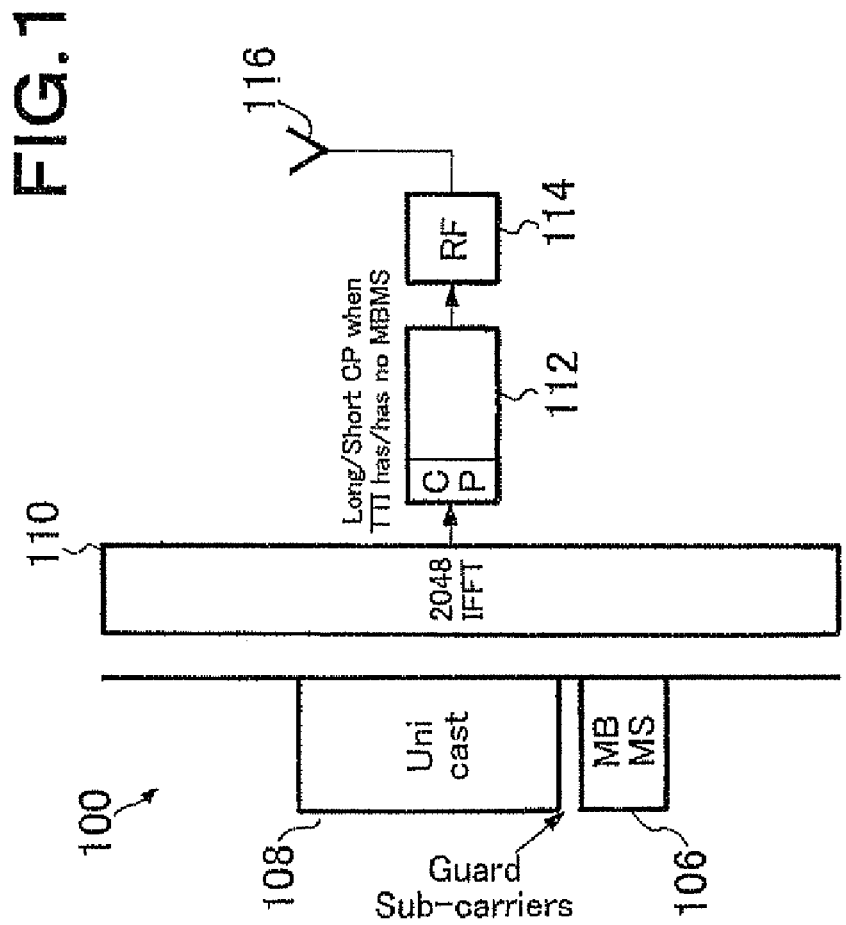

FIG. 1 shows a schematic view of a base transceiver station (BTS) 100 in communication with two UEs 102 and 104. The BTS 100 has a transmission bandwidth of 20 MHz whereas UE 102 has 5 MHz reception bandwidth and UE 104 has 20 MHz reception bandwidth. In the present example the BTS 100 is transmitting a MBMS service as well as uni-cast. Both UEs 102 and 104 are scheduled to receive the MBMS service whereas only UE 104 is intended to receive the uni-cast data.

In order to transmit both services simultaneously the BTS needs to multiplex the MBMS and uni-cast services. In the present embodiment, the network has allocated predefined portion of the frequency spectrum for all BTS to be used for transmission of MBMS services, thereby effectively defining a Single Frequency Network within the transmission spectrum of the network on which MBMS services will be transmitted.

In this example the BTS performs the multiplexing in the frequency domain, by assigning a first block of sub-carriers 106 for the transmission of the MBMS service and a second block of sub-carriers 108 for the transmission of the uni-cast service. All other BTS in the network will also assign the same block of sub-carriers to the transmission of MBMS services, and if they have a bandwidth larger than that band they can assign the remaining bandwidth to the transmission of uni-cast services.

After frequency multiplexing the data, the entire set of sub-carriers (which is 120-1 in this example, since the BTS

TABLE 1

Parameters for downlink transmission scheme in a preferred embodiment

| Transmission BW | 1.25 MHz | 2.5 MHz | 5 MHz | 10 MHz | 15 MHz | 20 MHz |
|---|---|---|---|---|---|---|
| Sub-frame duration | | | | 0.5 ms | | |
| Sub-carrier spacing | | | | 15 kHz | | |
| Sampling frequency | 1.92 MHz (3.84/2 MHz) | 3.84 MHz | 7.68 MHz (2 × 3.84 MHz) | 15.36 MHz (4 × 3.84 MHz) | 23.04 MHz (6 × 3.84 MHz) | 30.72 MHz (8 × 3.84 MHz) |
| FFT size | 128 | 256 | 512 | 1024 | 1536 | 2048 |
| Number of occupied sub-carriers | 76 | 151 | 301 | 601 | 901 | 1201 |

It should be understood that the present invention is not limited to the particular exemplary bandwidths and UE capabilities described above but may be applicable generally to networks having scalable transmission bandwidths and UEs of differing reception bandwidth.

In summary, embodiments of the present invention operate by effectively defining a Single Frequency Network (SFN) within the network's transmission bandwidth, which is dedicated to the transmission of all MBMS services. The remaining transmission bandwidth of each cell can then be used to transmit uni-cast data. Preferably the SFN will be transmitted on a bandwidth equal to the standard UE MBMS reception bandwidth capability, which in the preferred embodiments, is assumed to be 5 MHz. Additionally, in the illustrative embodiments each MBMS service will be sent in a separate transmission time interval (TTI). This enables an efficient sleep mode to be implemented in the UEs, as a UE only needs to receive the MBMS data in the TTI corresponding to the MBMS service(s) of interest. Because the MBMS signal on all cells is confined to the same transmission band, the time delay between received multipath signals will be relatively

100 has 20 MHz transmission bandwidth) is converted to a time domain signal, by inverse fast Fourier transform (IFFT) 110 block. The IFFT is applied to the entire frequency band of the transmitter to generate a time domain signal. In the illustrative embodiment the IFFT applied is a 2048 point IFFT, however other IFFT sizes can be used depending upon the available bandwidth of the transmitter (see table 1 above). Only one IFFT is conducted across the entire set of sub carriers, rather than conducting separate IFFTs on each camping band. This simplifies base transceiver station design as only one IFFT block whose size is only dependent on transmitter bandwidth is needed for each transmitter antenna.

As is typical to OFDMA systems, next a cyclic prefix is added to the time domain signal in a manner that will be know to those skilled in the art at 112. Because a single frequency network within the wider network has been defined, many BTS will be transmitting the same MBMS data at the same time, therefore it is possible for UEs to see many multipath signals with widely varying delays. Accordingly in transmit time intervals (TTIs) when an MBMS service is to be transmitted a long cyclic prefix is added to the time domain signal by block 112. Conversely, in TTIs where no MBMS service is to be transmitted a short cyclic prefix can be used, to minimize overhead.

This signal then undergoes further processing at 114 prior to transmission by a base station transmitter 116. The transmitted signal is then received by each of the UEs 102 and 104.

In order to receive the transmitted MBMS service, each of the UEs 102 and 104 tunes its carrier frequency to appropriate central frequency, i.e. the portion of the transmission spectrum on which the MBMS data is transmitted for UE 102 and the centre of the entire BTS transmission spectrum for UE 104.

Because of the reception bandwidth restrictions of UE 102, only a 5 MHz portion of the entire 20 MHz transmitted bandwidth is received by UE 102 using RF block 118-1. Conversely, because UE 104 has a 20 MHz reception bandwidth all of the transmitted bandwidth is received (using RF block 118-2), including the portion of the transmitted signal that carries the MBMS service.

Next the received signals undergo further RF processing and analogue to digital conversion (not shown). In the preferred embodiments the sampling frequency of digital samples at the output of A/D conversion block (not shown) is 7.68 MHz for UE 102 and 30,72 MHz for UE 104. The cyclic prefix is then removed in blocks 120-1 and 120-2, in UEs 102 and 104.

As noted above the length of the CP will vary depending on whether an MBMS service is being transmitted in a particular TTI. Accordingly the UE will need to be aware of the CP length changes when they occur. For UEs that are receiving MBMS services, e.g. UEs 102 and 104, this is relatively straightforward as these UEs will regularly monitor the Multicast control channel (MCCH) regularly. However, there may well be other UE in the network that are not subscribed to any MBMS services, or that are not capable of receiving MBMS. These UE will not monitor the MCCH, and therefore need another mechanism to know about CP length changes. In a first embodiment the UE can be left to perform blind detection of the CP length. This will be performed using standard methods know to those skilled in the art. Alternatively, the MCCH, or other control channel, can be designed so that all UEs receive signalling to tell them which TTIs contains a MBMS traffic channel (MTCH).

Returning to FIG. 1, both UEs then perform an FFT in blocks 122-1 and 122-2 in UEs 102 and 104 respectively, to convert the time domain signal into a frequency domain signal. Because of the radio tuning step performed initially, the size of the FFT performed is dictated by the reception bandwidth of the UE, and not by the position of the desired sub-carriers within cell transmission band. As can be seed from Table 1, UE 102 will use always 512 point FFT, because it has a 5 MHz reception bandwidth and is seeking to extract only the 301 sub-carriers containing the MBMS service. Similarly, UE 104 will always use always 2048 point FFT, because it has a 20 MHz reception bandwidth.

Figure 2:
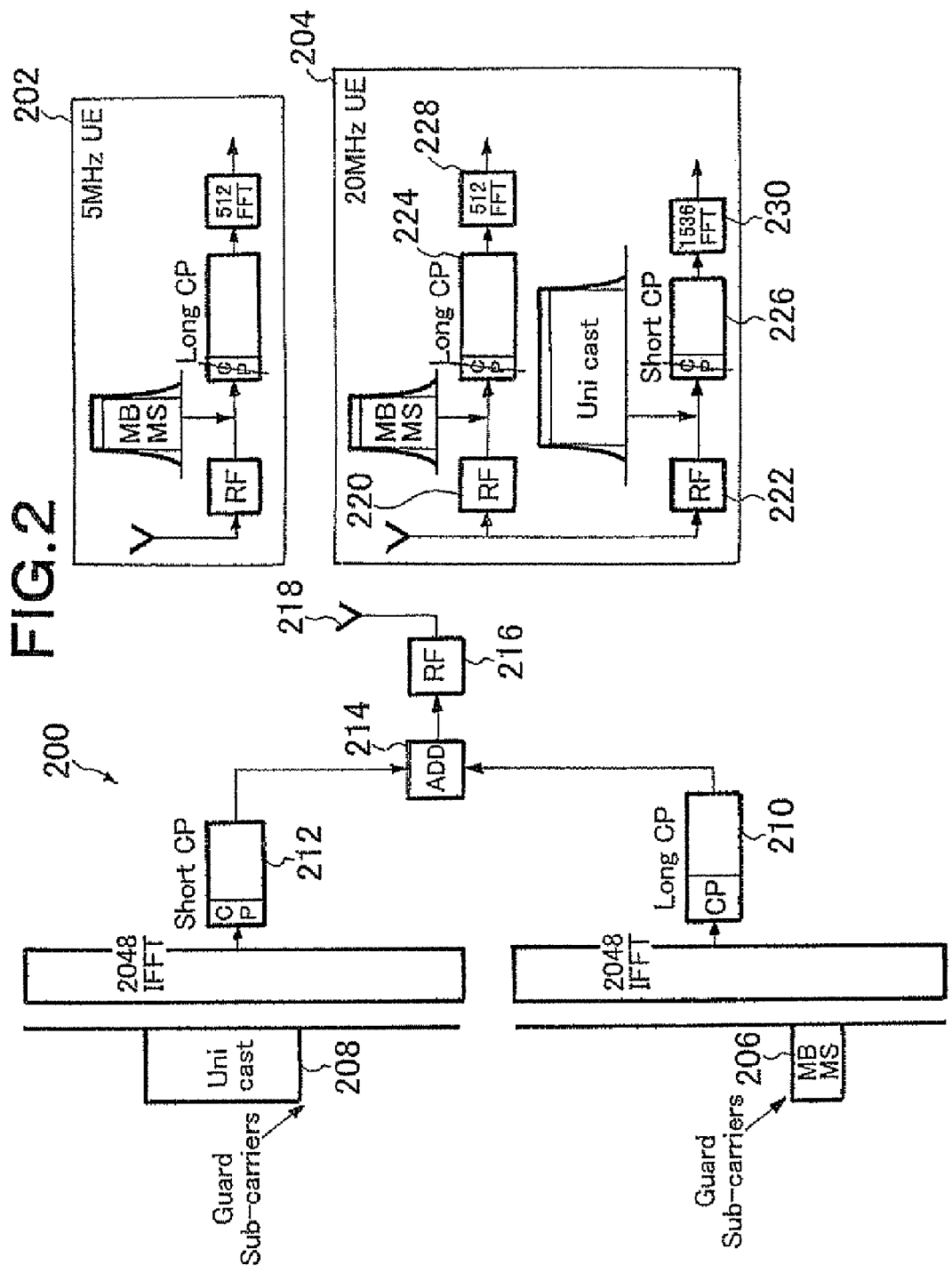
FIG. 2 depicts a schematic diagram of a base station transmitter and two UEs operating in a network operating according to a second embodiment of the present invention.

FIG. 2 shows a schematic view of a base transceiver station (BTS) 200 in communication with two UEs 202 and 204. As in FIG. 1, the BTS 200 has a transmission bandwidth of 20 MHz and UEs 202 and 204 have 5 MHz and 20 MHz reception bandwidths respectively. In the present example the BTS 200 is transmitting a MBMS service as well as uni-cast. Both UEs 202 and 204 are scheduled to receive the MBMS service whereas only UE 204 is intended to receive the uni-cast data. This embodiment differs from that of FIG. 1 in the multiplexing method used by the BTS. In this embodiment, rather than frequency multiplexing the MBMS data, converting the multiplexed signal to a time domain signal in one operation, this embodiment performs two separate IFFTs and combines the frequency multiplexed signals in the time domain. Turning to the figure, as in FIG. 1, the MBMS data is confined to a first band of sub-carriers 206 and the uni-cast data is confined to a second group of sub-carriers 208. These bands 206 and 208 do not overlap and therefore there is no interference between the signals in each group of sub-carriers. In order to minimise the complexity of large reception bandwidth UEs, the MBMS sub-carrier block 206 is located at one edge of the transmission spectrum of the BTS. Each of the sets of sub-carriers 206 and 208 are separately converted into a time domain signal by IFFT blocks 210 and 212. In order to ensure orthogonality of the signals is maintained both IFFT blocks are of the same length and span the entire width of the transmission spectrum of the BTS 200.

Next the time domain signal carrying the uni-cast data has a cyclic prefix (CP) added by block 212. Since BTS 200 will be the only BTS transmitting this data a short CP is used for the uni-cast data signal. The time domain signal carrying the MBMS data also has a cyclic prefix (CP) added (by block 210). However, since other BTS will also transmit the same data, a long CP will be added by block 210.

The two time domain signals will then be added at 214 and will then undergo RF processing at 206 prior to transmission by a base station transmitter 218. The transmitted signal is then received by each of the UEs 202 and 204.

UE 202 operates in the same manner as UE 102 of FIG. 1 and therefore will not be described in detail.

UE 204, however is different from the previous embodiment in that it has two RF processing parts to process the MBMS data and uni-cast data separately, consequently it also has two FFT blocks of different lengths. In TIE 204 the received RF signal is split into two components, one being a 5 MHz band carrying the MBMS data, which is processed by RF block 220, the other being a 15 MHz band carrying the uni-cast data, which is processed by RF block 222.

Because the CP of the uni-cast signal and multi-cast signal are different, the two CP removal blocks are different to each other. The CP removal block 224 for the MBMS signal is configured to remove the long CP attached to the MBMS time domain signal, whereas the CP removal block 226 for the uni-cast signal is configured to remove the short CP attached to the uni-cast time domain signal.

In this embodiment, the UE will not need to be aware of the CP length changes since the CP removal block 224 is configured to only operate on MBMS data.

Next the two signals are converted to the time domain. The MBMS stream is converted using a 512 point FFT block 228, corresponding to the 5 MHz wide MBMS transmission band defined in the network, and the uni-cast stream is converted using a 1536 point FFT block 230, corresponding to the remaining 15 MHz wide reception bandwidth of UE 204. UE 204 will also have a FFT block with size 2048 for use when processing the full 20 MHz bandwidth as one signal, which will add significantly to the complexity of the UE. As will be appreciated, MBMS (or other multicast services) will not be active in all TTIs. Therefore, UEs will not always need to receive, or be ready to receive, multi-cast data. Therefore there is a need for a certain level of signalling data relating to the transmission of MBMS data to be made by the network. In current networks complying with 3GPP Rel'6 the MBMS control channel (MCCH) is defined on a cell by cell basis. However in embodiments of the present invention where the MTCH is delivered via a single frequency network (SFN), this may not be the case and the MCCH could also be delivered via SFN.

In preferred embodiments of the present invention, the MBMS control and data channels shall be transmitted in the same frequency band in all cells in a MBMS Cell Group. This cell group will generally have the same transmission bandwidth as the defined MBMS reception capability of UEs in the network (which is assumed to be 5 MHz in the present case). The information about which band is used for MBMS and configuration of MCCH (so that UE can receive MCCH) will be sent on broadcast channel from each cell in the cell group.

Figure 3:
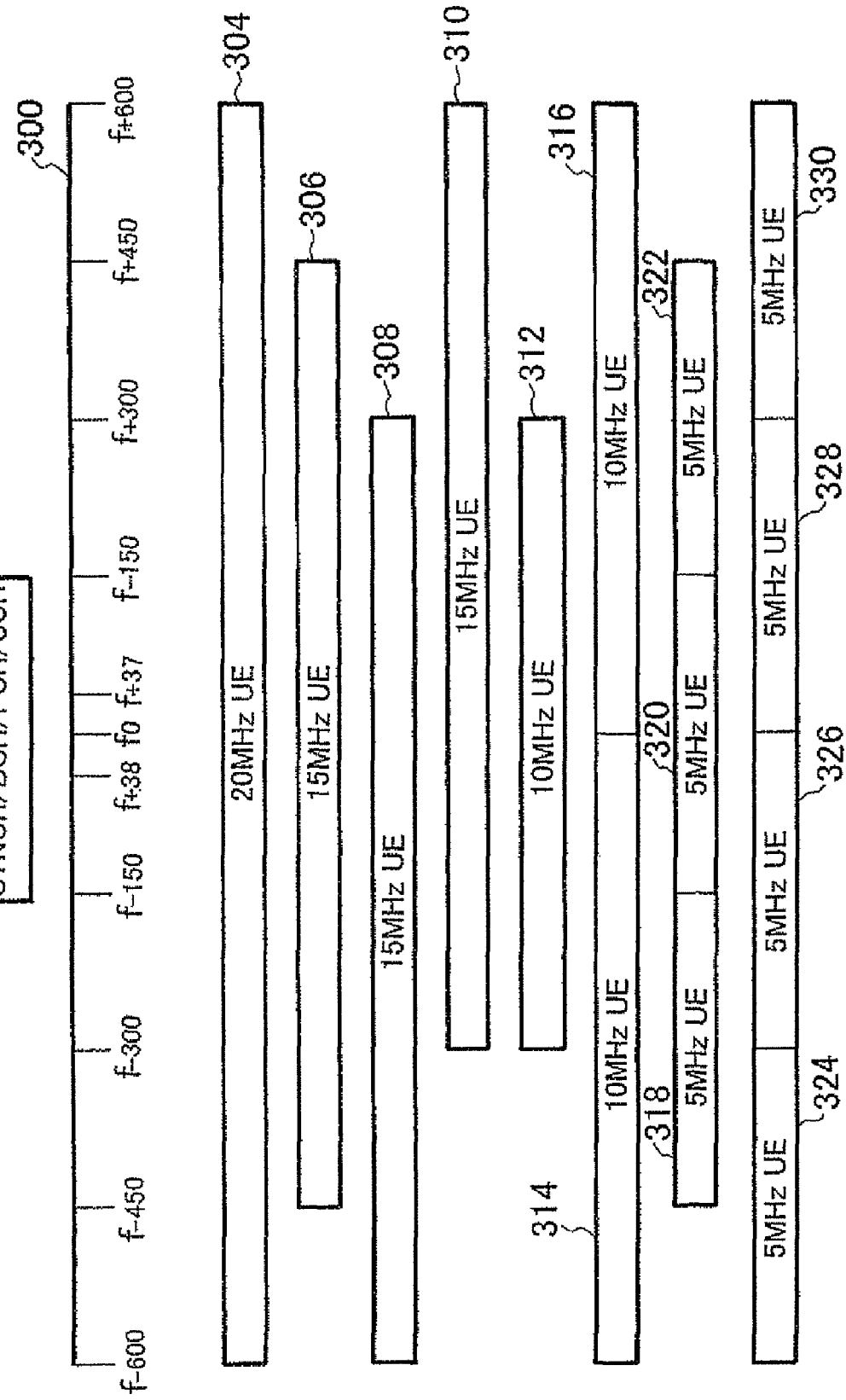
FIG. 3 shows various options for mapping bandwidth allocations for UEs having 5 MHz, 10 MHz, 15 MHz and 20 MHz reception capabilities in a 20 MHz bandwidth cell according to an embodiment of the present invention.

UEs interested in MBMS shall be required to read the MCCH at least once every modification period. In some circumstances this will mean that a UE will need to tune its RF from a camped band to the MBMS band to receive the MCCH. For example, FIG. 3 illustrates an exemplary band allocation scheme for a 20 MHz bandwidth cell for UEs having 5 MHz, 10 MHz, 15 MHz and 20 MHz reception bandwidths. The cell bandwidth is indicated by a frequency axis 300, which is graduated in sub-carriers (rather than in Hz) illustrating a 1201 sub-carrier frequency range from $f_{-600}$ to $f_{+600}$. Using the system parameters set out in Table 1 this can be seen to equate to a 20 MHz transmission bandwidth. Block 302, which is centred on $f_0$, is the common band in which the synch channel, BCH, PCH and SCH of the cell is transmitted. Bands 304 to 330 represent an exemplary set of possible "camping bands" for UEs operating in this 20 MHz cell.

In FIG. 3, if all MBMS control and data is transmitted in the central 5 MHz band 300 i.e. the common band and a UE is camped on a non-center band, e.g. bands 314, 316, 318, 322 or 324 to 330, then the UE has to switch its RF in order to read the MCCH or to receive MTCH. In this case, if the system schedules MBMS and uni-cast data in consecutive TTI for that UE, it may not be possible for it to receive both TTIs as it will take some time for the UE to switch its RF band.

This potential problem can be dealt with in one of several ways.

In the first embodiment the BTS's scheduler can be configured so as to not schedule uni-cast data, for UE's that need to switch RF frequencies to receive MBMS, for a predetermined number of TTIs before and/or after a burst of MBMS TTI(s). However because the scheduling takes place at the Node B MAC which does not know which UE is receiving which MBMS service at which TTI this solution requires the UEs to inform the Scheduler which MBMS service it is going to receive. This solution may not be ideal as uplink signalling can become quite expensive if multiple services are involved. Moreover the Scheduler must be configured to know the MCCH details.

In a preferred embodiment the UEs shall autonomously move, or request to move to camp on the MBMS band (e.g. the common band in the above example) and monitor shared channel in that band. In this case, the UE must signal the Scheduler to inform it that it has moved (or that it wants to move) to camp on the MBMS band. Whilst some uplink signalling is needed, it is far less than in the first embodiment.

In a further embodiment the system can simply moves UEs not camping on MBMS band into the MBMS band when MBMS data is to be transmitted. Again this solution is not ideal as some UEs are not receiving any MBMS services, and will be forced to share congested spectrum in that band.

In a fourth alternative a solution to this issue can be left to the UE. As in 3GPP Rel'6, the UE can be left to decide which services deserve priority. However, this solution will lead to wasted resources if scheduled uni-cast data is given lower priority than MBMS by a UE and the uni-cast data is not received due to RF switching between MBMS and Uni-cast bands.

The present invention should not be construed as being limited to the MBMS, reception, common and camping bands described herein, as the definition of such bands described above is somewhat arbitrary. More (or less) bands could be defined. For example in the 20 MHz bandwidth cell, 15 MHz bands could be defined with any central frequency between $f_{-150}$ and $f_{+150}$. Similarly 10 MHz bands could be defined with centre frequencies anywhere between $f_{-300}$ and $f_{+300}$. Also the common band could be defined at any point along the bandwidth of the cell. The present invention has been described in connection with the transmission of MBMS services, however it should be noted that the present invention is not limited to this application but can be applied to the transmission of other types of multi-cast data.

It will be noted that the description presented herein is limited to the case where cell bandwidth is 10 MHz or more, since for lower cell bandwidths such as 5 MHz (or below) all UE will be able to receive the whole transmission bandwidth, in which case both MBMS and Uni-cast data can be multiplexed in one TTI.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of operating a radio telecommunications network including, a plurality of base transceiver stations (BTSs) each transmitting on a respective transmission bandwidth, and one or more user equipments (UEs) each having a respective maximum reception bandwidth,
defining a common multicast frequency band within the respective transmission bandwidth of at least a first group of BTSs of the radio telecommunications network on which a multicast service is to be transmitted;
transmitting a multicast service in the common multicast frequency band from each BTS within the first group of BTSs; and
enabling each base station having a bandwidth greater than the width of the common multicast frequency band to transmit a uni-cast service in portion of its transmission bandwidth falling outside the multicast frequency band.

2. The method of operating a radio telecommunications network as claimed in claim 1, wherein a frequency of the common multicast frequency band is predefined.

3. The method of operating a radio telecommunications network as claimed in claim 1, wherein a common multicast frequency band has a bandwidth equal to the lowest maximum reception bandwidth amongst the UEs.

4. The method of operating a radio telecommunications network as claimed in claim 1, wherein the first group of BTSs includes all BTSs in the radio telecommunications network.

5. A radio telecommunications network including a plurality of base transceiver stations (BTSs) each transmitting on a respective transmission bandwidth, and one or more user equipments (UEs) each having a respective maximum reception bandwidth, said network being configured to implement a method as claimed in any one of claims 1 to 4.

6. A method of transmitting a multicast service on a base transceiver station (BTS) having a first transmission bandwidth, to one or more user equipment (UEs) each having a respective maximum reception bandwidth, the method including:
transmitting a multicast service in a predefined multicast frequency band; and transmitting a uni-cast service in one or more frequency bands falling outside the multicast frequency band, in the event that the first transmission bandwidth is larger than the bandwidth of the multicast frequency band.

7. The method of transmitting a multicast service on a base transceiver station as claimed in claim 6, wherein the method further includes:

adding a long cyclic prefix to a time domain signal including multicast data.

8. The method of transmitting a multicast service on a base transceiver station as claimed in claim 6, wherein the method further includes:

combining signals representing said uni-cast service and said multicast service to generate a transmitted signal where such that the orthogonality of a plurality of sub-carriers forming the signals representing said uni-cast service and said multicast service is maintained in the transmitted signal.

9. The method of transmitting a multicast service on a base transceiver station as claimed in claim 6, wherein the method further includes:

multiplexing data representing said uni-cast service and data representing said multicast service in the frequency domain; and converting a multiplexed frequency domain signal into a time domain signal.

10. The method of transmitting a multicast service on a base transceiver station as claimed in claim 9, wherein the step of, converting the multiplexed frequency domain signal, includes:

performing an inverse fast Fourier transform (IFFT) having a size dependent on the first transmission bandwidth.

11. The method of transmitting a multicast service on a base transceiver station as claimed in claim 9 which further includes:

adding a long cyclic prefix to the time domain signal generated from a signal obtained by multiplexing data representing said uni-cast service and data representing said multicast service in the frequency domain.

12. The method of transmitting a multicast service on a base transceiver station as claimed in claim 11 which further includes:

adding a short cyclic prefix to the time domain signal generated from a signal obtained by multiplexing data representing said uni-cast service and data representing said multicast service in the frequency domain, in the event that no multicast service is to be transmitted in a particular time transmission interval.

13. The method of transmitting a multicast service on a base transceiver station as claimed in claim 6, wherein the method further includes:

converting data representing said uni-cast service to a time domain signal; and converting data representing said multicast service to a time domain signal separately to said data representing said uni-cast service.

14. The method of transmitting a multicast service on a base transceiver station as claimed in claim 13, wherein the step of, converting the data representing said uni-cast service to a time domain signal, includes:

performing an inverse fast Fourier transform (IFFT) having a size dependent on the first transmission bandwidth.

15. The method of transmitting a multicast service on a base transceiver station as claimed in claim 13, wherein the step of converting the data representing said multicast service to a time domain signal, includes:

performing an inverse fast Fourier transform (IFFT) having a size dependent on the first transmission bandwidth.

16. The method of transmitting a multicast service on a base transceiver station as claimed in claim 13 which further includes:

adding a first cyclic prefix having a first length to the time domain signal carrying the uni-cast service;

adding a second cyclic prefix having a second length to the time domain signal carrying the multicast service, wherein the second length is longer than said first length; and adding said time domain signals prior to transmission to said UE.

17. A method of transmitting a multicast service on a base transceiver station as claimed in claim 6 which further includes signaling signalling to one or more UEs whether a multicast service is to be transmitted in a particular time transmission interval.

18. A base transceiver station configured to transmit a multicast service using a method as claimed in any one of claims 6 to 17.

* * * * *